March 9, 1954  R. B. JACOBS ET AL  2,671,343
VAPOR PRESSURE BY THERMAL CONDUCTIVITY
Filed Nov. 30, 1951  2 Sheets-Sheet 1

INVENTORS:
Robert B. Jacobs
BY Sixt Frederick Kapff

Everett A. Johnson
ATTORNEY

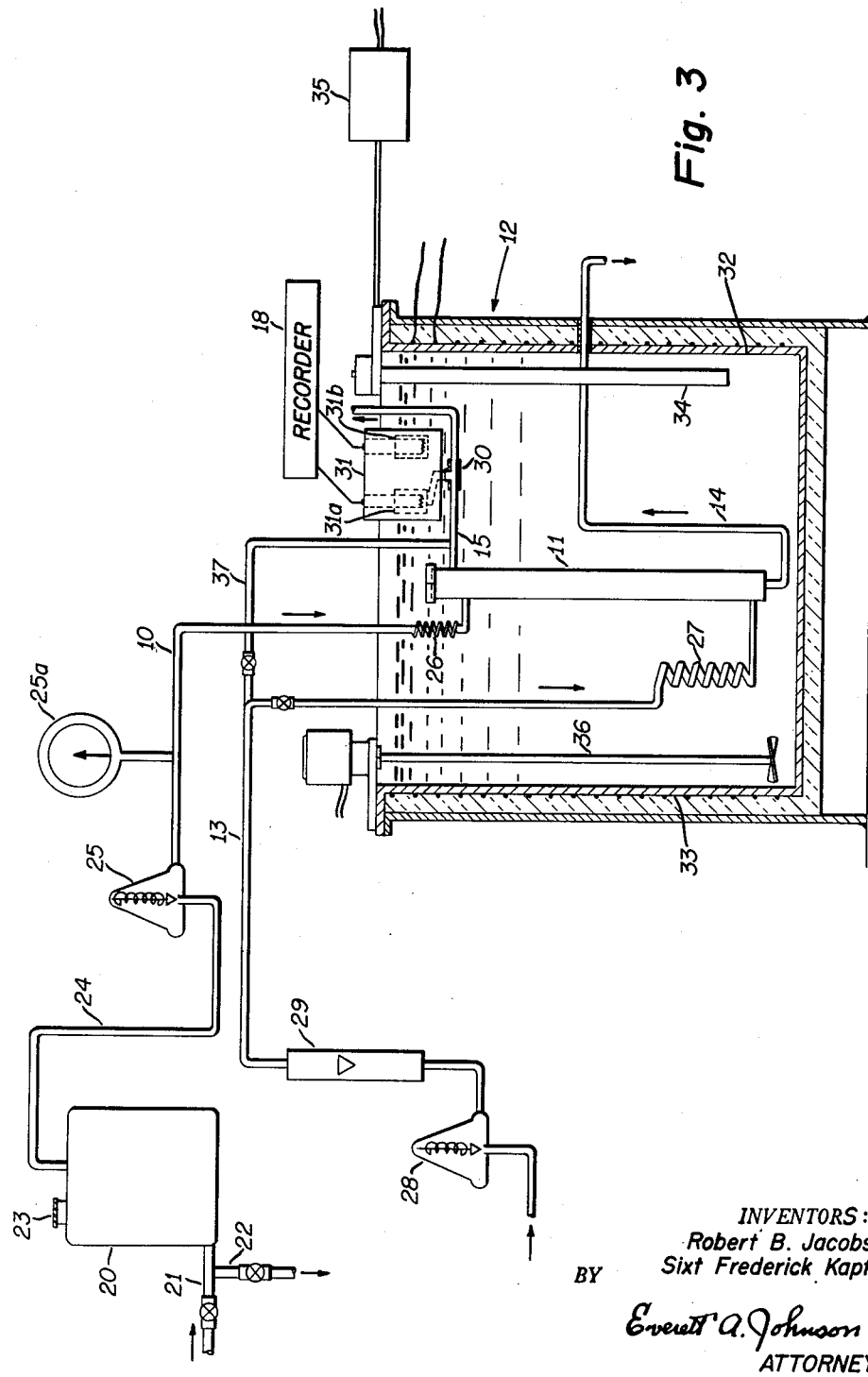

UNITED STATES PATENT OFFICE 2,671,343

VAPOR PRESSURE BY THERMAL CONDUCTIVITY

Robert B. Jacobs and Sixt Frederick Kapff, Homewood, Ill., assignors to Standard Oil Company, Chicago, Ill., a corporation of Indiana Application November 30, 1951, Serial No. 259,044

14 Claims. (Cl. 73—53)

This invention relates to an improved method and apparatus for determining the vapor pressure of liquid hydrocarbons such as crude oils and gasolines. It has particular reference to an apparatus for automatically indicating and recording the vapor pressure of crude oils being transported by pipe lines and of commercial gasoline mixtures.

In the shipment of crude oils by pipe line it is frequently desirable to add low boiling materials to increase vapor pressure and decrease viscosity. Instrumental control of the blending process is desirable to prevent shipment of material of such high vapor pressure that vapor lock may occur in the pipe line pumps. Likewise, the receiving terminal is interested in distinguishing the interface between such high vapor pressure material and adjacent streams of different vapor pressure characteristics which may be following in the pipe line.

Previous instruments proposed for determining crude vapor pressures continuously have involved elements which were subject to corrosion or waxing and required excessive maintenance. It is therefore a primary object of this invention to provide a device which employs a minimum of critical components and minimizes maintenance difficulties.

In the marketing of petroleum fuels and particularly gasoline which are produced by blending a number of hydrocarbon fractions, an accurate knowledge of the vapor pressure of the product is essential. For example, it has been found that according to the seasons of the year a standard volatility in gasoline is required since too high a volatility can lead to vapor lock and too low a volatility makes for hard starting. Furthermore, the different economic values and the available blending stocks used to make up the gasoline place a premium on accurate blending which achieves the correct volatility but at the same time utilizes the relatively heavy and light constituents most economically.

As is well known, the vapor pressure of blended fuels can be determined by withdrawing a batch sample from a pipe line or reservoir and thereafter measuring the pressure exerted by the vapor of the liquid at a controlled constant temperature. Conventionally, vapor pressures of petroleum products are measured by the so-called "Standard Reid Test" as described in the ASTM code D 323–43 which was originally devised in 1930. This is essentially a laboratory method which for maximum accuracy requires very careful manipulation as well as very careful sampling and refrigeration of samples during storage. The test gives reliable results only if the involved procedural steps are carefully followed.

The actual manipulation time for a standard Reid test is approximately 15 minutes per sample but the total elapsed testing time, including chilling time, generally amounts to several hours. In the usual case where samples are drawn by operators, delivered to a technical service laboratory and there measured, the total elapsed time from the drawing of the sample to the reporting back by the laboratory generally is of the order of about four hours. Obviously in operations where large quantities of material are handled, the difference between control based on up-to-the-minute information and that based on information which is four hours late is satisfactory neither from the quality of product nor the economy of operations.

The standard Reid test provides reasonably accurate results but is subject to errors of manipulation and it is a comparatively slow procedure even when carried out by a highly skilled operator. Moreover, in ordinary blending operations as much as 5000 barrels of gasoline per hour may be produced during which the composition of the streams being blended may change materially, thus influencing the properties of the product. If the blending operator must wait a half hour or longer after any change in the operating conditions before he can determine the effect of the change on the product, he obviously may be unable to prevent the occurrence of substantial deviations from the prescribed range of vapor pressure during such time. Accordingly, at a subsequent check test the blended product will not meet specifications of vapor pressure and would be reblended.

Efforts have been made to devise equipment for measuring the so-called "true vapor pressure" of the gasoline but all such devices have been very sensitive to the rates of flow through the apparatus. Likewise the devices have been susceptible to plugging or to the accumulation of fixed gases in the testing apparatus, rendering the devices unreliable and ultimately inoperative.

It is therefore a general object of the present invention to provide improvements in apparatus and method for continuously and automatically determining the vapor pressure of petroleum fractions. Another object of the invention is to provide an improved continuous vapor pressure determining apparatus which is of simple and rugged construction and utilizes a minimum of mechanical elements. Still another object of the invention is to provide method and means for determining continuously the vapor pressure of crude oils in shipment. An additional object of the invention is to provide a mechanical device for accurately measuring and recording the vapor pressure and means for the spontaneous and accurate control of blending hydrocarbon streams of different volatility to obtain a stream of the desired vapor pressure characteristics whether it be for the purpose of transporting crude oil or for providing a blended gasoline. These and other objects of the invention will become apparent as the description thereof proceeds.

Briefly the present invention attains the above and other objects by providing a system for continuous vapor pressure measurement which avoids the difficulties heretofore encountered. The invention comprises a novel method and apparatus for determining the vapor pressure of petroleum fractions wherein the vapor pressure is indicated by measuring the thermal conductivity of an air stream after bringing it to the saturation point with the liquid being tested. By passing a stream of air and a stream of test liquid countercurrently through a packed column, an air-vapor mixture is obtained under controlled conditions and then measuring the thermal conductivity of the mixture measured at the controlled temperature. This conductivity we have discovered to be proportional to the vapor pressure of the test liquid.

Apparatus employed in the determination of vapor pressure, according to our invention, will be described in greater detail by reference to the accompanying drawings wherein:

Figure 3 is a schematic representation showing one embodiment of the invention in more or less detail.

Figure 1:
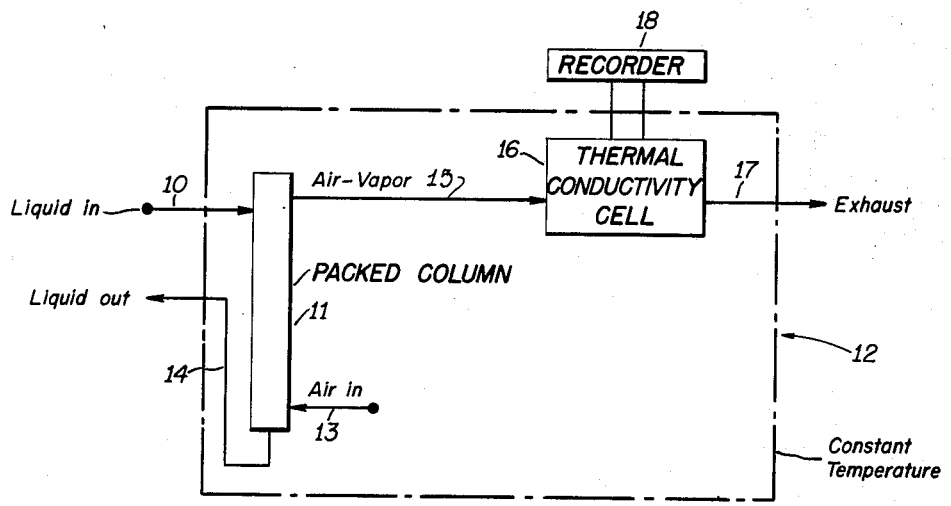
Figure 1 is a diagrammatic showing of the apparatus.

Referring to the drawing, the sample is supplied by feed line 10 to an upper part of the packed column 11 which is immersed within a constant temperature bath 12. This bath is maintained at a temperature below the boiling point of the test liquid and for most stocks below about 100° F. The liquid sample flows downwardly within the packed column 11, which may contain any suitable packing, for example berl saddles, countercurrent to air supplied by line 13 under controlled pressure and flow rate. Liquid flows from the bottom of the packed column 11 via upturned outlet line 14. This line 14 extends upwardly along the packed column 11 a distance sufficient to give the desired liquid head within the column 11. An air stream saturated with vapor is withdrawn from the packed column 11 at a high point therein via transfer line 15 which introduces the vapor-saturated air stream into a thermal conductivity cell means 16 and is finally vented by line 17 to exhaust. The thermal conductivity as determined by the cell 16 is recorded by recorder 18 and this measure of thermal conductivity can be calibrated in terms of Reid vapor pressure of the sample.

The operation comprises establishing the desired air and liquid flows through lines 10 and 13, maintaining the constant temperature, and reading the thermal conductivity of the effluent air-vapor mixture on the recorder 18. Typical operating conditions are a bath temperature of about 90° F., an air flow of about 75 cc./minute and a liquid flow of about 40 cc./minute. Using these conditions the typical calibration curve shown in Figure 2 was obtained. Since saturation of the air stream is the optimum condition of the operation, our system is relatively insensitive to liquid and air flows so long as these are such that a minimum of stripping of the petroleum fraction occurs. We have found that no difference is obtained in thermal conductivity at 40 cc./minute liquid for changes of two times in air flow rate. However, the increase in liquid flow from about 30 to about 40 cc. per minute produces a change corresponding to about 0.1 Reid.

A more detailed apparatus is shown in Figure 3. The liquid feed line 10 in this embodiment is supplied by reservoir 20 which may be replaced by a constant delivery pump or by merely a tap to a line containing a flowing stream of the liquid under test. The reservoir 20 as illustrated includes conduit means 21 and 22 for introducing and withdrawing water at the bottom of the reservoir. The liquid under test is introduced into the reservoir over the water by inlet 23 and is displaced from the reservoir 20 by raising the level of water. This type of operation avoids the loss of any light ends and prevents possible vapor lock of a pump in the test equipment.

The liquid, however supplied to the system, passes by line 24 through pressure control valve 25 which discharges into feed line 10. A coil 26 in line 10 is a capillary for purposes of maintaining constant flow and of bringing the liquid to the constant bath temperature. The air supply line 13 includes a preheating coil 27 and the desired air flow is provided through the pressure regulator 28 and rotameter 29. The liquid sample and the air stream flow under controlled flow rates and pressures via lines 10 and 13, respectively, through the associated heating coils 26 and 27 immersed in the constant temperature bath 12. The preheated streams then flow countercurrent through the packed column 11 whereby the air stream becomes saturated with vapor of the test liquid and is withdrawn via transfer line 15. The liquid passing through the column 11 is withdrawn by line 14 and discharged at a level approximating one-half the height of the column 11 so as to provide a head of liquid within the contactor 11 through which the air is bubbled.

On the transfer or exhaust line 15 is a T-block 30 having a threaded connection on its upper side to the thermal conductivity cell 31. An example of a suitable cell 31 for use in our invention is a VECO cell type 138–1 manufactured by the Victory Engineering Corporation, Newark, New Jersey, but others may be used. This type of cell includes two similar filaments, one of which is exposed to a sample chamber 31a into which the air and vapor mixture diffuses from the T-block 30 and the other in a standard chamber 31b containing air. These filaments are connected in arms of a Wheatstone bridge circuit the unbalance of which is fed to the circuit of recorder 18.

The operation of thermal conductivity cells of this type is well known. In our system the air saturated with vapor diffuses into the cell 31 from the T block 30. The extent of saturation of the air stream affects the thermal conductivity measurement and we have discovered that the change in conductivity is proportional to change in vapor pressure of the liquid under test.

If desired an air bypass line 37 may be provided for purging the cell 31 between successive liquid samples. Such purging can be effected by closing or throttling the valve 13a on line 13 and opening the valve 37a on line 37.

The constant temperature bath 12 may comprise an insulated vessel 32 having electrical coil heater 33 wrapped about it as shown in Figure 3. The heat input to the heater 33 is controlled in order to maintain the bath 12 at constant temperature by means of a cartridge thermal switch apparatus 34 that is also immersed in the bath and connected to a relay means 35 whereby current is intermittently supplied to the heater 33 in response to any temperature change in the bath 12. An agitating device or stirrer 36 may be used to provide more uniform circulation of the bath liquid and thus improve the temperature control. Other conventional means for obtaining constant temperature can be employed in place of the illustrated constant temperature bath.

In an example of operation of the vapor pressure apparatus shown in the drawing, successive liquid gasoline samples were introduced into the feed line 10 from reservoir 29 under a positive pressure of about 40 p. s. i. and at a feed rate of about 0.6 gallon per hour. The packed column 11 comprised about 1.5 feet of tubing having an inside diameter of 1.0 inch and was packed with 0.25 inch berl saddles and was maintained at a temperature of about 90° F. by the bath 12. The recorder 18 used had an arbitrary scale and a range of 0–10 M. V. corresponding to a range of about 8 to 15 p. s. i. Reid vapor pressure. It is contemplated, however, that the scale of recorder 18 can be calibrated to indicate Reid vapor pressure.

Data in the table illustrate results from one series of tests according to our invention on the described apparatus.

*Table*

Figure 2:
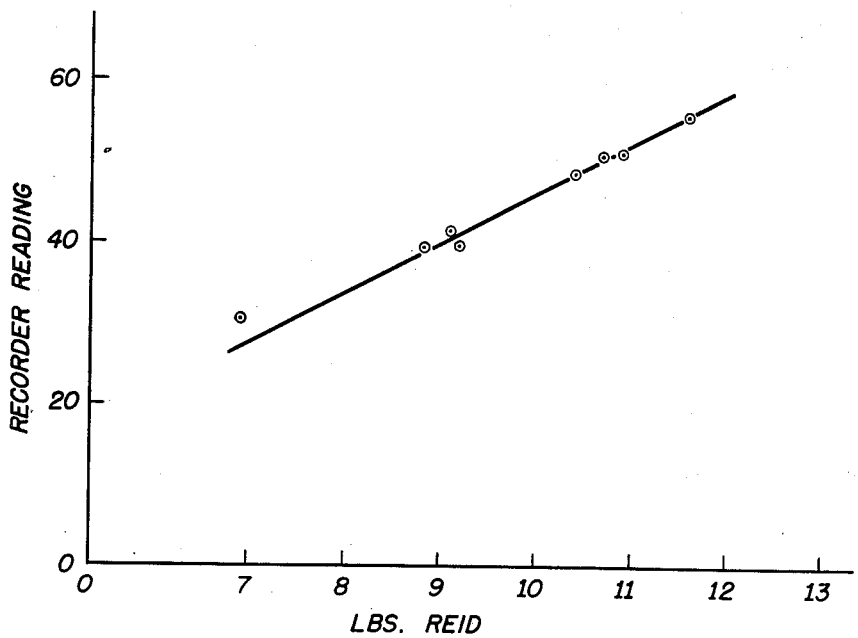
Figure 2 is a plot of the correlated observed values obtained according to the invention.

| Gasoline | Recorder Reading | Vapor Pressure Read From Fig. 2 | Reid Vapor Pressure by Bomb Test | Deviation lbs. Reid |
| --- | --- | --- | --- | --- |
| A | 30.4 | 7.5 | 6.9 | +0.6 |
| B | 39.4 | 9.0 | 8.8 | +0.2 |
| C | 41.5 | 9.3 | 9.1 | +0.2 |
| D | 39.5 | 8.9 | 9.2 | −0.3 |
| E | 48.4 | 10.5 | 10.4 | +0.1 |
| F | 50.5 | 10.8 | 10.7 | +0.1 |
| G | 51.0 | 10.9 | 10.9 | 0.0 |
| H | 55.4 | 11.6 | 11.6 | 0.0 |

Deviations in the values for repeated tests on a given gasoline sample are comparable to successive readings made according to the standard Reid vapor pressure test where deviations of 0.2 lb. Reid are acceptable. Thus the device according to our invention is both automatic and accurate The apparatus described herein may be adapted to a petroleum products or crude pipe line and any change in the vapor pressure of the stream being transported will be rapidly and accurately indicated on the recorder 18. The output of the recorder can be connected so as to operate suitable relays and automatic control blending valves so that a stream of desired vapor pressure characteristics can be produced.

Although our invention has been described in terms of specific apparatus which is described in considerable detail, it should be understood that this is by way of illustration only and that the invention is not limited thereto. Alternative embodiments and operating techniques will become apparent to those skilled in the art in view of our disclosure Accordingly, modifications in the method and means of our invention are contemplated without departing from the spirit of the described invention or from the scope of the appended claims.

What we claim is:

1. The method of obtaining an indication of the vapor pressure of a liquid which comprises the steps of flowing at a substantially uniform temperature said liquid countercurrent to a stream of air thereby saturating the air stream with vapor from the liquid, and determining the thermal conductivity of said saturated air at said temperature as an indication of the vapor pressure of the liquid under test.

2. The method for determining the vapor pressure of a hydrocarbon mixture wherein the low-boiling constituents are of a narrow boiling range which comprises the steps of flowing a liquid mixture countercurrent to an upflowing stream of air in a contacting zone, maintaining the temperature of such countercurrent contacting at a level below about 100° F., passing the air through the contacting zone at a rate permitting the saturation of the air with vapors of the liquid under test, and determining the thermal conductivity of the saturated air at the temperature of said contacting zone as an indication of the vapor pressure of the liquid under test.

3. The method of obtaining an indication of the vapor pressure of gasoline which comprises the steps of flowing liquid gasoline downwardly through a first contacting zone maintained at a substantially uniform temperature, flowing preheated air upwardly through said contacting zone, withdrawing an air stream saturated with vapor of the liquid under test from said contacting zone, and measuring the thermal conductivity of the saturated air stream at the temperature of said contacting zone as an indication of the vapor pressure of the liquid gasoline under test.

4. The method of obtaining an indication of the vapor pressure of a crude oil including a minor proportion of mixed low-boiling hydrocarbons which comprises the steps of heating said crude oil in the liquid state to a pre-selected temperature, introducing the preheated liquid into a countercurrent contacting zone, introducing preheated air into said countercurrent contacting zone, and flowing said air countercurrent to said liquid therein, withdrawing a stream of air saturated with gasoline vapors, and measuring the thermal conductivity of the saturated air at the temperature of the contacting step as an indication of the vapor pressure of the crude oil under test.

5. The method of determining the vapor pressure of a liquid hydrocarbon stream which comprises the steps of introducing liquid hydrocarbon at a constant pressure and uniform rate into a countercurrent contacting zone, flowing a stream of preheated air upwardly through said liquid gasoline in said contacting zone, maintaining said zone at a substantially constant temperature below about 100° F., flowing a stream of air saturated with gasoline vapors from said contacting zone at said constant temperature, and determining the thermal conductivity of the saturated air stream at said constant temperature as an indication of the vapor pressure of the gasoline.

6. An apparatus for continuously obtaining and recording an indication of the vapor pressure of a flowing stream of liquid hydrocarbons comprising in combination means for heating said stream of hydrocarbons, means for maintaining said stream at a pre-selected uniform temperature, means for contacting said heated stream with a gasiform fluid which is non-condensable at said uniform temperature, and means for determining the thermal conductivity of said gasiform fluid saturated with vapors of said liquid at said preselected temperature.

7. An apparatus for determining vapor pressure of a blended mixture of high and low-boiling hydrocarbons which comprises a pump means, a heating coil, a feed line between said pump means and said coil, an expansion valve intermediate said pump means and said heating coil, an elongated contacting chamber, a contacting packing in said chamber, said feed line communicating with an upper part of said contacting chamber, a second feed line communicating with a lower part of said communicating chamber, a heating coil in said second line, a first outlet duct communicating with the bottom of said contacting chamber, an exhaust line communicating with an upper part of said contacting chamber, thermal conductivity measuring means on said exhaust line, and a constant temperature bath means, said contacting chamber and exhaust elements being immersed in said constant temperature bath means.

8. An apparatus for continuously indicating the vapor pressure of a flowing stream of liquid hydrocarbons comprising in combination a first conduit means supplying the liquid under test, a second conduit means supplying a stream of gasiform fluid, a contacting chamber, said first conduit means discharging into an upper portion of said chamber and said second conduit means discharging into a lower portion of said contacting chamber, a drain means from said contacting chamber, an exhaust line communicating with an upper part of said contacting chamber, a thermal conductivity cell on said exhaust line, and a constant temperature bath means in which said contacting chamber and said exhaust line are immersed.

9. An apparatus for automatically determining the vapor pressure of a hydrocarbon stream which comprises in combination a packed contacting chamber, a thermal conductivity cell, a constant temperature bath in which said chamber and said cell are immersed, a first feed line discharging into said contacting chamber near the top thereof, a second feed line discharging into said contacting chamber near the bottom thereof, a liquid drain from said contacting chamber having a point of discharge at a level which is intermediate the top and bottom of said contacting chamber, an exhaust line extending from near the top of said chamber to said thermal conductivity cell, and recorder means actuated by said thermal conductivity cell for indicating the values proportional to the vapor pressure of the liquid under test.

10. An apparatus for continuously determining the apparent vapor pressure of a blended gasoline which comprises in combination a liquid gasoline feed line, means for elevating the temperature of the liquid while passing through a portion of said feed line, an aeration gas feed line, means for elevating the temperature of the aeration gas while passing through a portion of said second feed line, means for countercurrent contacting of said liquid gasoline and aeration gas, a thermal conductivity cell, means for passing aeration gas saturated with gasoline vapors through said conductivity cell, and a constant temperature bath means, said heating means on said feed lines, said contacting chamber, and said thermal conductivity cell being immersed in said constant temperature bath means.

11. The apparatus of claim 10 including a thermal conductivity recording means calibrated in terms of pounds per square inch Reid vapor pressure.

12. The apparatus of claim 10 including in addition a valved bypass line from said second feed line to said thermal conductivity cell whereby said cell may be purged of aeration gas and vapor mixtures by a lean aeration gas.

13. The apparatus of claim 10 wherein a water displacement pump means discharges liquid gasoline into said first feed line.

14. An apparatus for obtaining an indication of the vapor pressure of a liquid which comprises in combination means for flowing a stream of liquid at a preselected uniform temperature, means for countercurrently contacting said stream of liquid with a gasiform fluid which is noncondensible at said uniform temperature, an outlet means from said last mentioned countercurrent contacting means, and means for determining the thermal conductivity of said gasiform fluid withdrawn through said outlet means and saturated with vapors of said liquid at said preselected temperature.

ROBERT B. JACOBS.
SIXT FREDERICK KAPFF.

References Cited in the file of this patent

UNITED STATES PATENTS

| Number | Name | Date |
|---|---|---|
| 1,855,774 | Schneider | Apr. 26, 1932 |
| 2,002,101 | Valby et al. | May 21, 1935 |
| 2,501,377 | Cherry | Mar. 21, 1950 |
| 2,540,377 | Pachaly | Feb. 6, 1951 |